(12) United States Patent
Matsushima et al.

(10) Patent No.: US 11,355,809 B2
(45) Date of Patent: Jun. 7, 2022

(54) VEHICLE SUBSTRUCTURE FOR BATTERY CASE

(71) Applicant: HONDA MOTOR CO., LTD., Tokyo (JP)

(72) Inventors: Yuki Matsushima, Wako (JP); Chihiro Sakurada, Wako (JP); Koichi Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 17/062,814

(22) Filed: Oct. 5, 2020

(65) Prior Publication Data

US 2021/0104717 A1    Apr. 8, 2021

(30) Foreign Application Priority Data

Oct. 3, 2019 (JP) .............................. JP2019-182870

(51) Int. Cl.
*B60K 1/04* (2019.01)
*H01M 50/20* (2021.01)

(52) U.S. Cl.
CPC .............. *H01M 50/20* (2021.01); *B60K 1/04* (2013.01); *B60K 2001/0438* (2013.01); *H01M 2220/20* (2013.01)

(58) Field of Classification Search
CPC ................................ B60K 1/04; H01M 50/20
See application file for complete search history.

(56) References Cited

U.S. PATENT DOCUMENTS

| | | | | |
|---|---|---|---|---|
| 8,540,272 | B1 * | 9/2013 | Vitale | B62D 21/14 |
| | | | | 280/638 |
| 9,259,998 | B1 * | 2/2016 | Leanza | B62D 25/20 |
| 2018/0370570 | A1 | 12/2018 | Ayukawa | |

FOREIGN PATENT DOCUMENTS

| | | |
|---|---|---|
| JP | H03-112791 A | 5/1991 |
| JP | 2016-052863 A | 4/2016 |
| JP | 2017-193299 A | 10/2017 |
| JP | 2019-006303 A | 1/2019 |
| JP | 2019-130937 A | 8/2019 |

OTHER PUBLICATIONS

Office Action received in corresponding Japanese application No. 2019-182870 dated Mar. 15, 2022 with English translation (7 pages).

* cited by examiner

*Primary Examiner* — Jonathan Ng
*Assistant Examiner* — James J Triggs
(74) *Attorney, Agent, or Firm* — Rankin, Hill & Clark LLP

(57) ABSTRACT

A vehicle substructure is capable of changing arrangement in a battery case depending on the type and/or size of batteries. The vehicle substructure includes: a battery case having a battery housed therein and including a bottomed case pan having an opening at a top thereof, and a case cover to close the opening of the case pan; a floor panel positioned above the battery case; a pair of right and left seat frames fixed to a top surface of the floor panel; and a battery cross member extending in a vehicle width direction in the battery case, fastened to the pair of right and left seat frames and fixed to the floor panel, wherein the pair of right and left seat frames extend in a vehicle front-rear direction and are provided with mounting holes in the vehicle front-rear direction for fastening the battery cross member.

2 Claims, 9 Drawing Sheets

VEHICLE SUBSTRUCTURE FOR BATTERY CASE

CROSS-REFERENCE TO RELATED APPLICATION

This application claims the benefit of priority to Japanese Patent Application No. 2019-182870 filed on 3 Oct. 2019, the disclosures of all of which are hereby incorporated by reference in their entireties.

TECHNICAL FIELD

The present invention relates to a substructure of a vehicle such as an electric vehicle.

BACKGROUND OF THE INVENTION

A vehicle substructure is disclosed in Japanese Patent Application Publication No. 2016-52863 (hereinafter, referred to as Patent Document 1), for example, that includes a side sill (rocker) disposed on an outer side in a vehicle width direction of a floor panel and extending in a vehicle front-rear direction, and a floor cross member disposed on the floor panel and extending in the vehicle width direction. The vehicle substructure disclosed in Patent Document 1 further includes a sub side sill (sub rocker) to couple the side sill with the floor cross member. Patent Document 1 describes that the sub side sill (sub rocker) is provided to effectively prevent the side sill (rocker), when a load of lateral collision has been inputted to the side sill, from collapsing inward in the vehicle width direction.

SUMMARY OF THE INVENTION

Problems to be Solved

Incidentally, Patent Document 1 describes that the floor cross member is joined (fixed) at both ends in the vehicle width direction thereof to the sub side sill (sub rocker). Accordingly, when the vehicle substructure disclosed in Patent Document 1 is applied to a battery case, arrangement in the battery case may not be easily changed depending on the type and/or size of batteries housed in the battery case, for example.

The present invention has been made in view of the above-identified problem and is intended to provide a vehicle substructure capable of changing arrangement in a battery case depending on the type and/or size of batteries.

Solution to Problem

In order to achieve the above-described objective, the present invention provides a vehicle substructure including: a battery case having a battery housed therein and including a bottomed case pan having an opening at a top thereof, and a case cover to close the opening of the case pan; a floor panel positioned above the battery case; a pair of right and left seat frames fixed to a top surface of the floor panel; and a cross member extending in a vehicle width direction in the battery case and fastened to the pair of right and left seat frames, wherein the pair of right and left seat frames extend in a vehicle front-rear direction and are provided with mounting holes in the vehicle front-rear direction for fastening the cross member.

Advantageous Effects of the Invention

The present invention provides a vehicle substructure capable of changing arrangement in a battery case depending on the type and/or size of batteries.

EMBODIMENTS OF THE INVENTION

Figure 1:
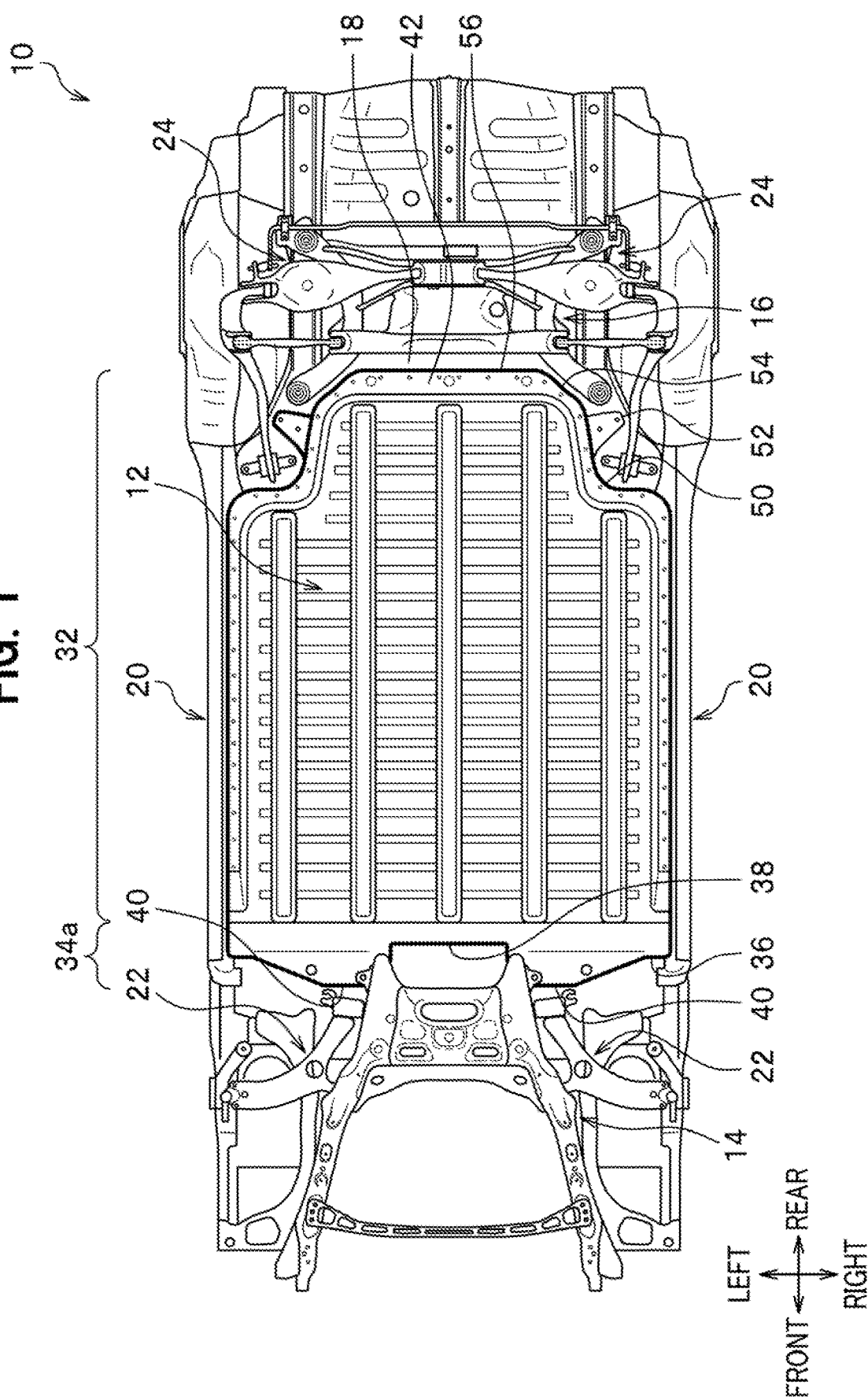
FIG. 1 is a bottom view of a vehicle having a vehicle substructure according to an embodiment of the present invention.
Figure 2:
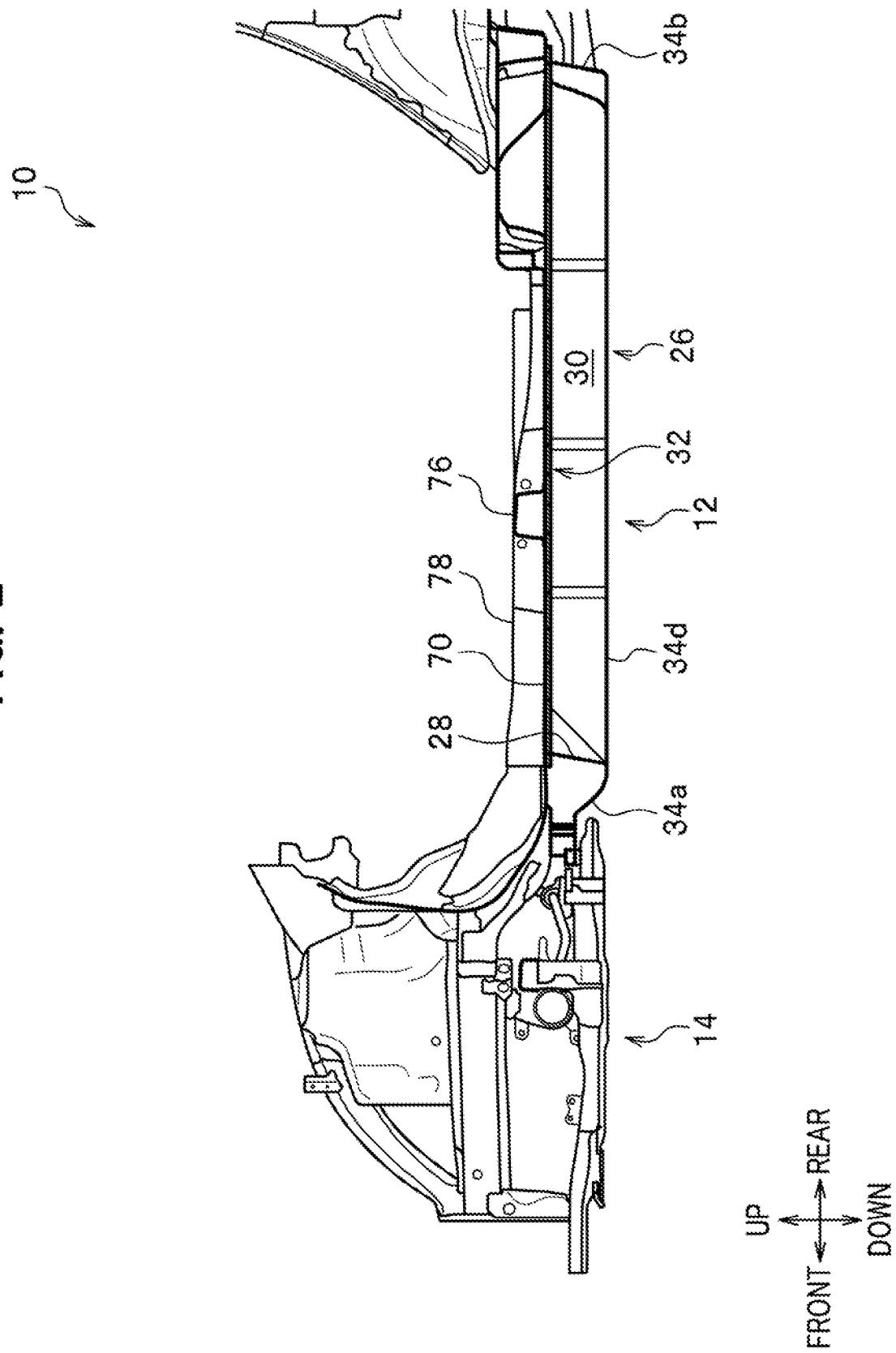
FIG. 2 is a lateral view of the vehicle in FIG. 1, partially cross-sectional in a vehicle front-rear direction.
Figure 3:
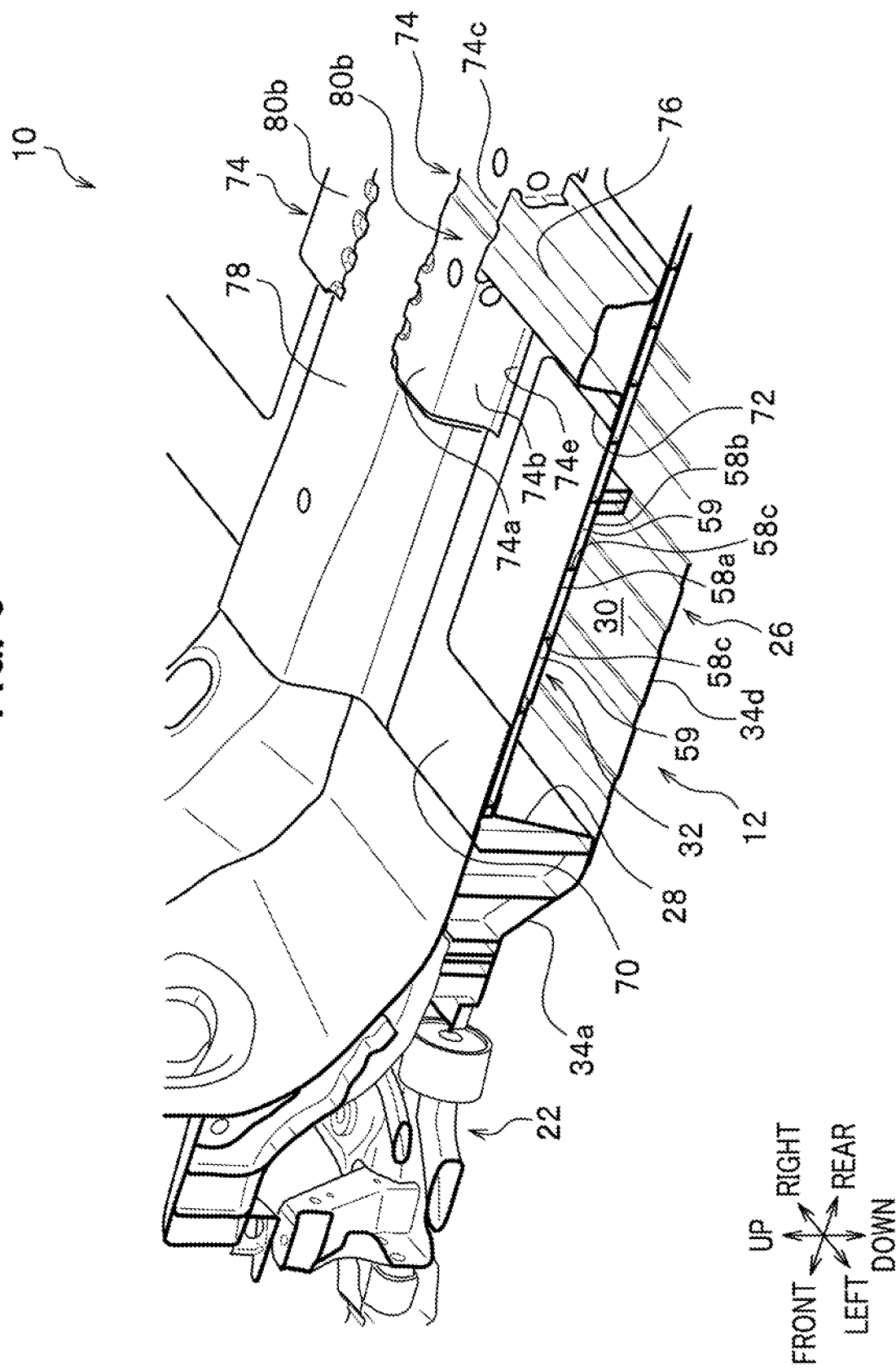
FIG. 3 is a perspective view of the vehicle in FIG. 1, partially cutaway in the vehicle front-rear direction.
Figure 4:
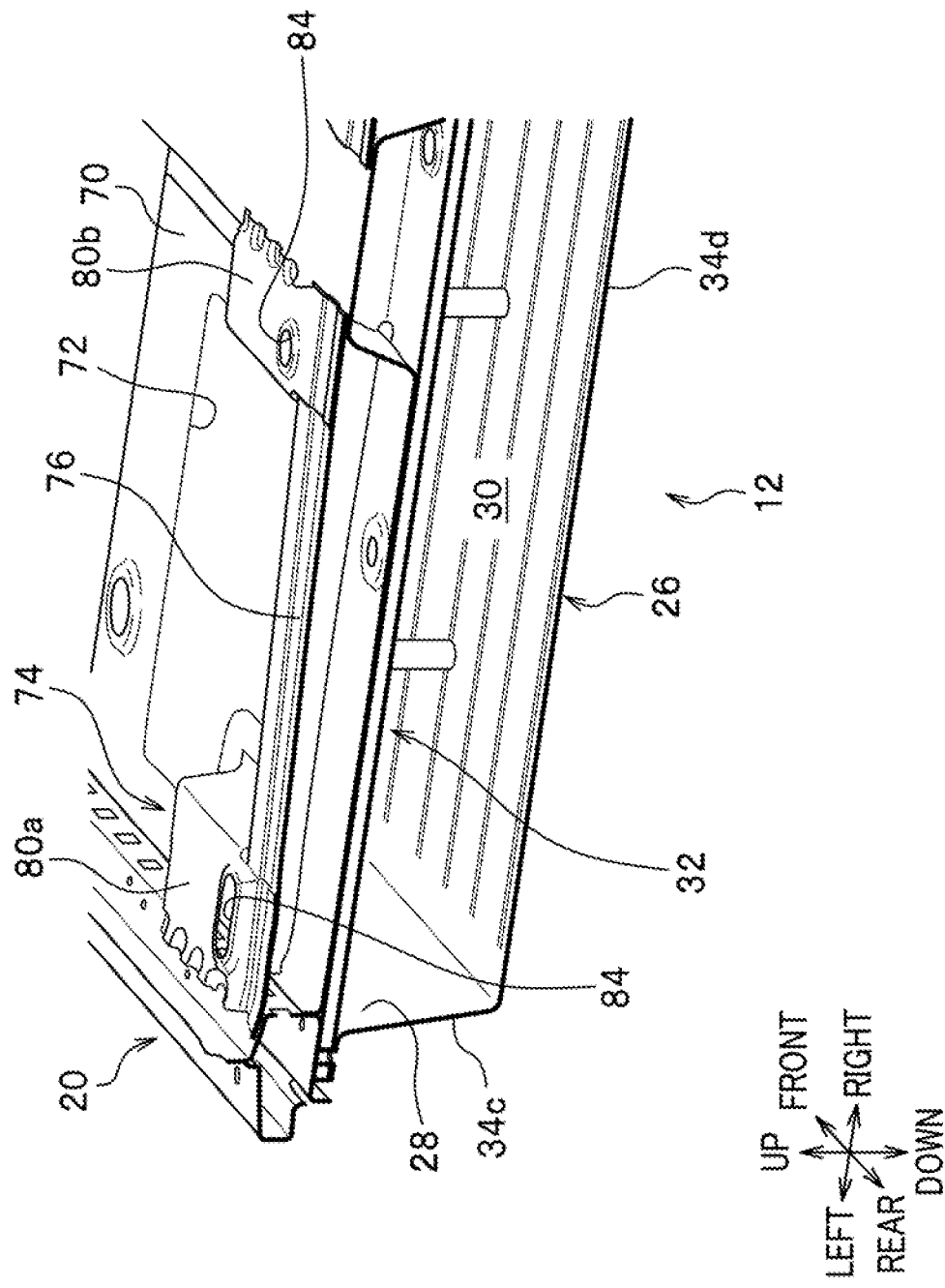
FIG. 4 is a perspective view of the vehicle in FIG. 1, partially cutaway in a vehicle width direction.
Figure 5:
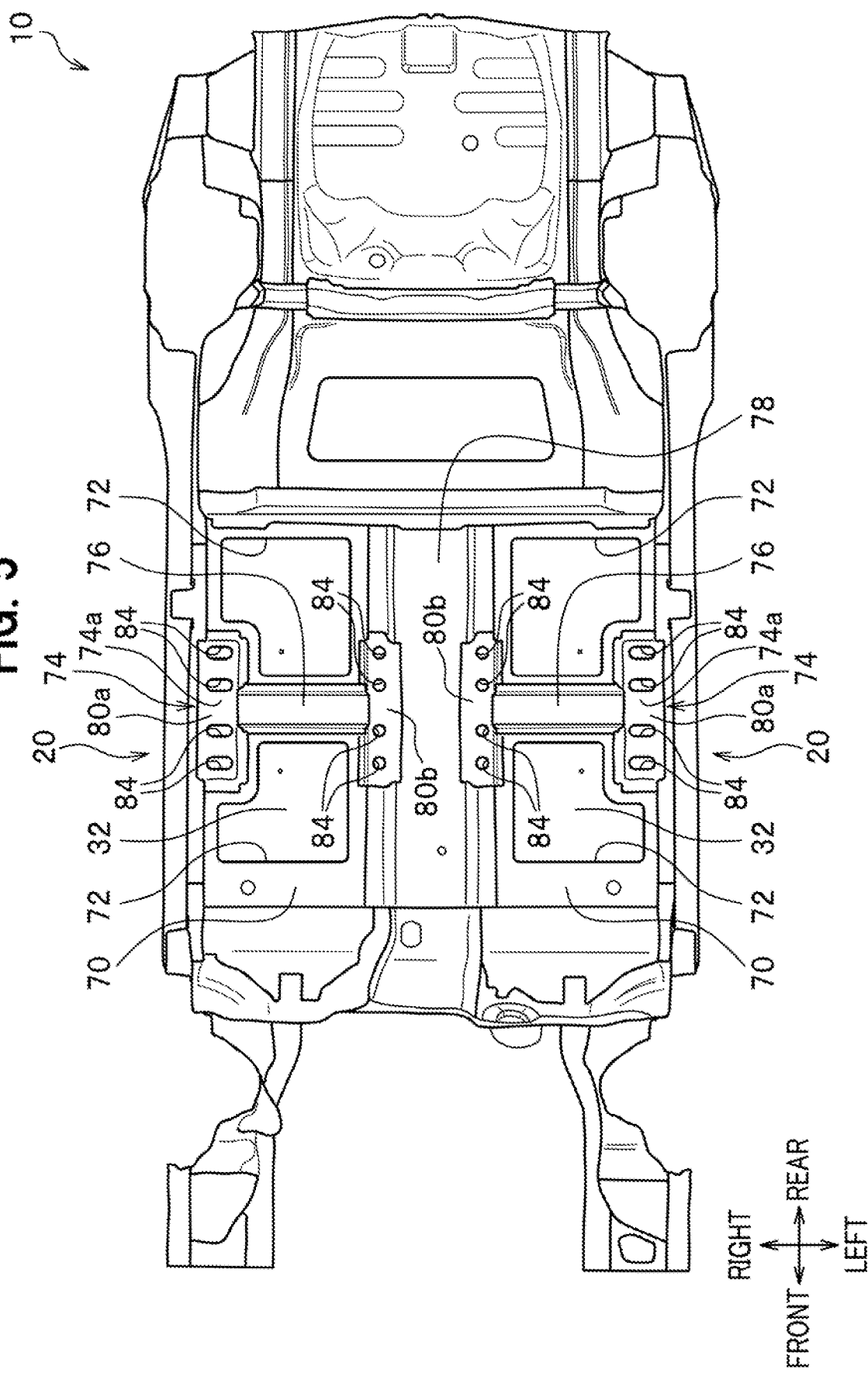
FIG. 5 is a top view of the vehicle in FIG. 1.
Figure 6:
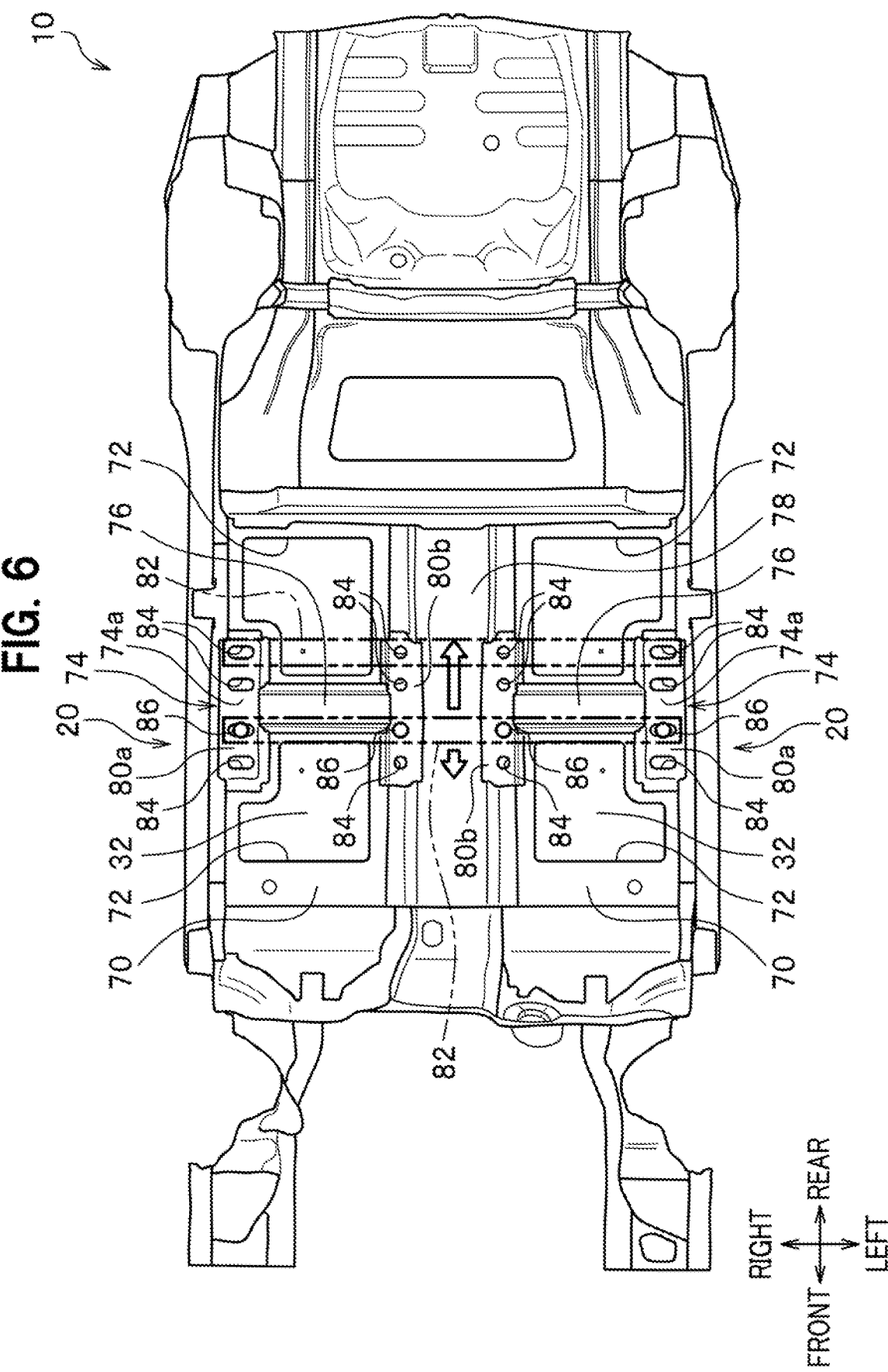
FIG. 6 is a plan view of a battery cross member having a mounting position in the vehicle front-rear direction thereof changeable with respect to a pair of right and left seat frames.

Hereinafter, an embodiment of the present invention is described in detail, with reference to the drawings as required. FIG. 1 is a bottom view of a vehicle having a vehicle substructure according to an embodiment of the present invention; FIG. 2 is a lateral view of the vehicle in FIG. 1, partially cross-sectional in a vehicle front-rear direction; FIG. 3 is a perspective view of the vehicle in FIG. 1, partially cutaway in the vehicle front-rear direction; FIG. 4 is a perspective view of the vehicle in FIG. 1, partially cutaway in a vehicle width direction; FIG. 5 is a top view of the vehicle in FIG. 1; and FIG. 6 is a plan view of a battery cross member having a mounting position in the vehicle front-rear direction thereof displaceable with respect to a pair of right and left seat frames.

Note that "front-rear" indicates the vehicle front-rear direction, "right-left" indicates the vehicle width direction (right-left direction), and "up-down" indicates a vehicle up-down direction (vertically up-down direction), respectively.

A vehicle substructure according to the embodiment of the present invention is applied to a vehicle 10 such as an electric vehicle, a hybrid vehicle, a fuel battery vehicle. The vehicle 10 includes a high-voltage battery (not shown), an electric motor (motor for travelling), and electric equipment such as a PDU (Power Drive Unit) to control and supply power from the battery to the electric motor.

The vehicle 10 includes a battery case 12 as an energy source for driving the electric motor, as shown in FIGS. 1 and 2. The battery case 12 is disposed under a center in the vehicle front-rear direction of the vehicle between a front subframe 14 and a rear subframe 16, in a bottom view. A front end, when installed in the vehicle, of the battery case is coupled to a rear end, when installed in the vehicle, of the front subframe 14. A rear end, when installed in the vehicle, of the battery case is coupled to a rear vehicle body 18 as a vehicle body member. Both ends in the vehicle width direction of the battery case 12 are respectively coupled to a pair of right and left side sills 20.

In addition, as shown in FIG. 1, a pair of right and left front suspension mechanisms 22 is disposed in front of the battery case 12, in the vehicle, on both sides in the vehicle width direction. Likewise, a pair of right and left rear suspension mechanisms 24 is disposed behind the battery case 12, in the vehicle, on both sides in the vehicle width direction. Note that the rear suspension mechanisms 24 are each configured as a trailing suspension including a trailing arm.

The battery case 12 includes a bottomed case pan 26 having an opening 28 at a top thereof, and a case cover 32 to close and seal the opening 28 of the case pan 26 to define a chamber 30, as shown in FIGS. 2 and 3. The chamber 30 of the battery case 12 houses a plurality of batteries (not shown). Note that FIG. 1 shows the battery case 12 with the case pan 26 removed, except a front wall 34a (to be described below), that is, the case cover 32 and the front wall 34a, as viewed from the bottom.

As shown in FIG. 2, the case pan 26 is formed to have a substantially rectangular shape, in a lateral view, and includes the front wall 34a at a front thereof in the vehicle, a rear wall 34b at a rear thereof in the vehicle, a pair of right and left side walls 34c (see FIG. 4) on both sides in the vehicle width direction thereof, and a bottom wall 34d to couple lower ends of the front wall 34a, rear wall 34b, and pair of right and left side walls 34c.

The case cover 32 is made of a plate in a flat plate shape formed with extrusion molding by an extruder (not shown), to have a substantially rectangular shape (see FIGS. 3 and 4) in a planar view. A front end of the case cover 32 abuts on a rear-side top edge of the front wall 34a to close the opening 28 of the case pan 26 (see FIGS. 2 and 3).

As shown in FIG. 1, the front wall 34a is formed, at a front end 36 thereof, with a recess 38 located at the center in the vehicle width direction and dented (set back) rearward. A pair od right and left protrusions 40, protruding frontward and coupled to the front suspension mechanism 22, are provided on both the right and left sides of the recess 38. Note that a reference numeral 76 indicates a vehicle body cross member, and a reference numeral 78 indicates a center tunnel.

Figure 7:
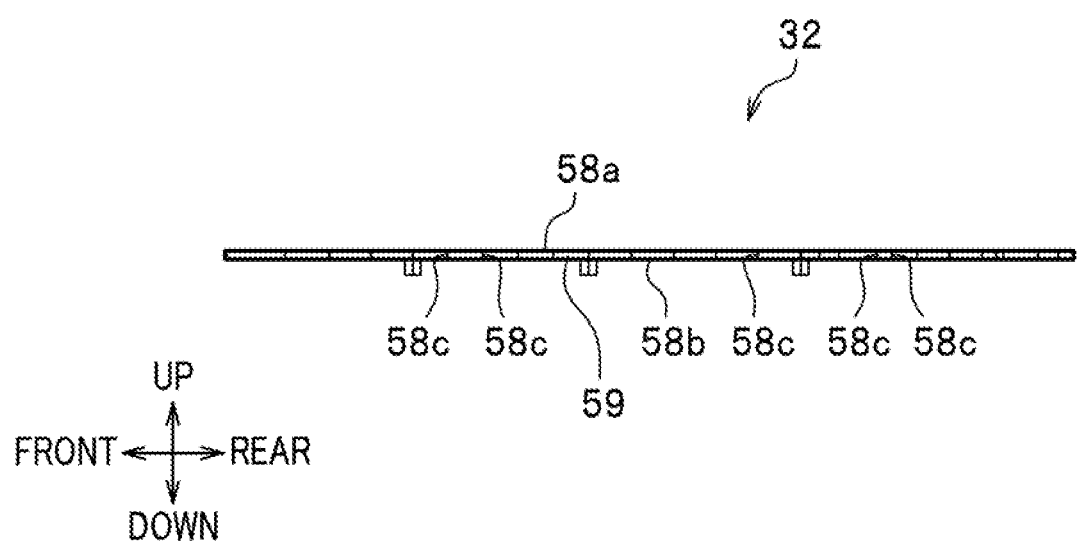
FIG. 7 is a perspective view of a case cover, partially cutaway in the vehicle front-rear direction.

FIG. 7 is a lateral view of a case cover, partially cutaway in the vehicle front-rear direction.

As shown in FIG. 7, the case cover 32 has a sandwich structure in the up-down direction to have a top plate 58a located at a top thereof, a bottom plate 58b located at a bottom thereof, and partitions 58c to couple the top plate 58a with the bottom plate 58b. The partition 58c linearly extends in the vehicle width direction. The partitions 58c adjacent to each other in the vehicle front-rear direction define therebetween a hollow slit 59 (see FIGS. 3 and 7) to extend in the vehicle width direction. Note that a distance between the adjacent partitions 58c varies in the vehicle front-rear direction.

In addition, a top surface of the case cover 32 has no such frames that bulge upward provided at front and rear edges and right and left edges thereof, to have a flat surface as with the rest thereof. That is, the top surface of the case cover 32 is flat at the front and rear edges and the right and left edges thereof.

Further, the case cover 32 has a floor panel 70 disposed on the top surface thereof, as shown in FIGS. 3 to 5. The floor panel 70 is provided with panel openings 72 at part of areas vertically overlaying the case cover 32.

The vehicle 10 further includes the pair of right and left side sills 20, right and left seat frames 74 fixed to a top surface of the floor panel 70, and the vehicle body cross members 76, as shown in FIG. 5. The pair of right and left seat frames 74 are disposed on the right and left sides in the vehicle width direction of the center tunnel 78 at the center of the vehicle. The seat frames 74 include a pair of right and left outer seat frames 80a connected to the side sills 20 located at outer sides in the vehicle width direction, and a pair of right and left inner seat frames 80b connected to the center tunnel 78.

The outer seat frames 80a are disposed to face the inner seat frames 80b in the vehicle width direction. The vehicle body cross member 76 has a hat shape in an axial cross section (see FIG. 3) and has bottom flanges on both sides thereof joined to the top surface of the floor panel 70. The vehicle body cross member 76 connects the outer seat frames 80a with the inner seat frames 80b, respectively, on the right and left sides in the vehicle width direction of the center tunnel 78.

Figure 8:
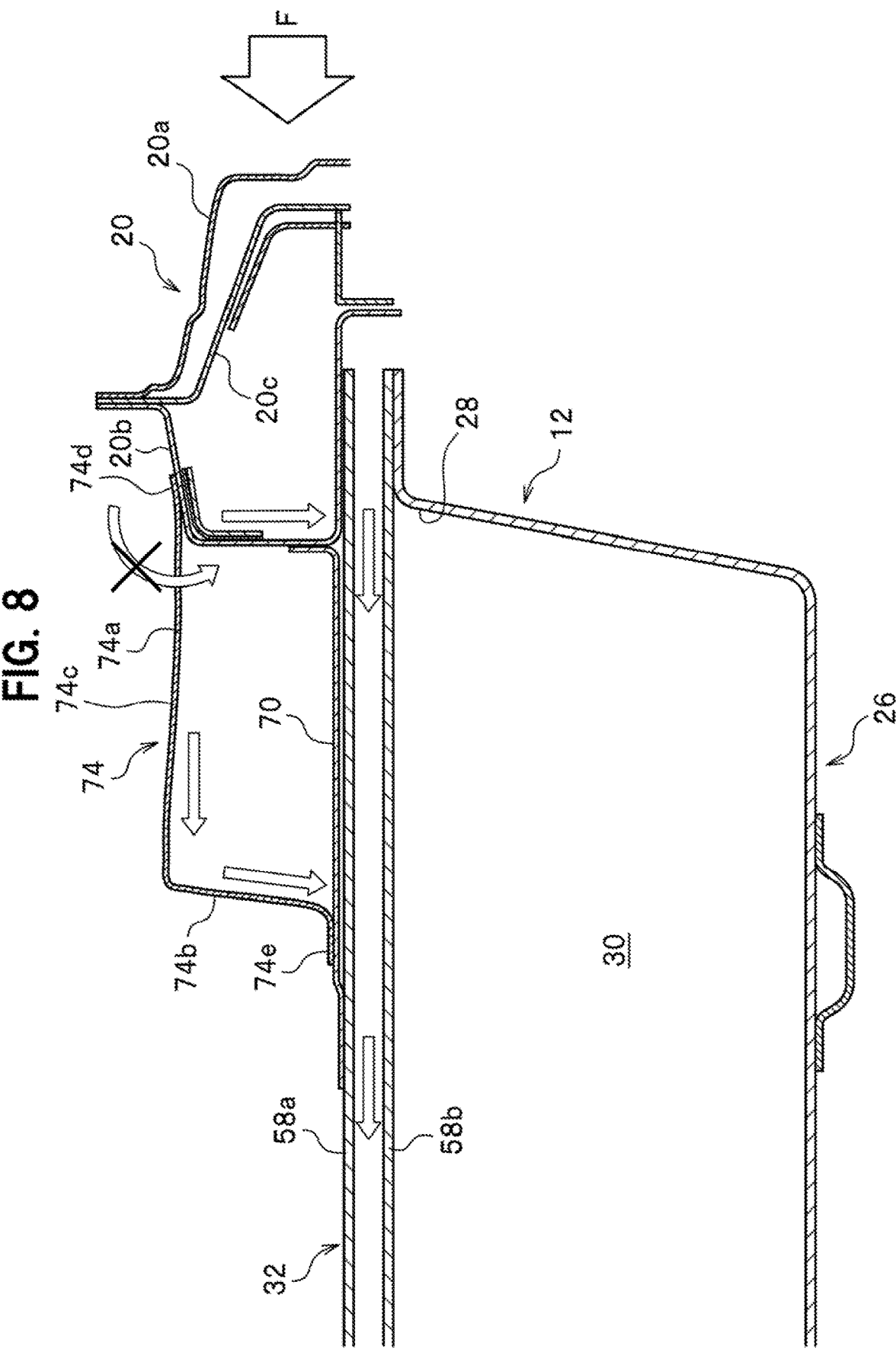
FIG. 8 is a schematic cross-sectional view indicating a lateral collision load inputted to a side sill being transmitted inward in the vehicle width direction along the case cover.

The side sills 20 are disposed on both the right and left sides in the vehicle width direction, and extend in the vehicle front-rear direction. As shown in FIG. 8, the side sill 20 includes an outer side sill 20a disposed on an outer side in the vehicle width direction, an inner side sill 20b disposed on an inner side in the vehicle width direction, and a side sill stiffener 20c interposed between the outer side sill 20a and the inner side sill 20b.

The right and left seat frames 74 are connected with each other by a battery cross member (cross member) 82 extending in the vehicle width direction, as shown in FIG. 6. Note that the battery cross member 82 is described in detail below.

A vertical cross section of the seat frame 74 has a substantially L-shape (see FIG. 8 to be described below). The seat frame 74 includes a horizontal plate 74a extending substantially horizontally, and a vertical wall 74b curved at an inner end in the vehicle width direction of the horizontal plate 74a and extending downward. A center portion 74c in the vehicle front-rear direction of the horizontal plate 74a is joined to the vehicle body cross member 76 (see FIG. 3). An outer end 74d in the vehicle width direction of the horizontal plate 74a is joined to the inner side sill 20b of the side sill 20, as shown in FIG. 8. A lower end 74e of the vertical wall 74b is joined to a top surface of the floor panel 70.

The horizontal plate 74a of the seat frame 74 is provided with mounting holes 84 for fastening the battery cross member 82 (see FIG. 6) in the vehicle width direction, as shown in FIG. 5.

The outer seat frames 80a closer to the right and left side sills 20 are formed with the mounting holes 84 in a longhole shape extending in the vehicle width direction in a planar view. The inner seat frames 80b closer to the center tunnel 78 at the center in the vehicle width direction are formed with the mounting holes 84 in a circular shape in a planar view. Note that the mounting holes closer to the side sills 20 have a longhole shape to allow for absorbing manufacturing error and installation error. The battery cross member 82 is fastened and fixed to the case cover 32 and the floor panel 70 (see FIG. 9).

The mounting holes 84 are arranged in the outer seat frames 80a and the inner seat frames 80b at predetermined intervals in the vehicle front-rear direction. Note that the mounting holes 84 are four in number in the present embodiment, as an example, but are not limited thereto as long as being two or more in number. Alternatively, various types of the outer seat frames 80a and the inner seat frames 80b having different number of the mounting holes 84 may be prepared in advance to allow for selecting any seat frame 74 depending on the type and/or size of the battery.

Figure 9:
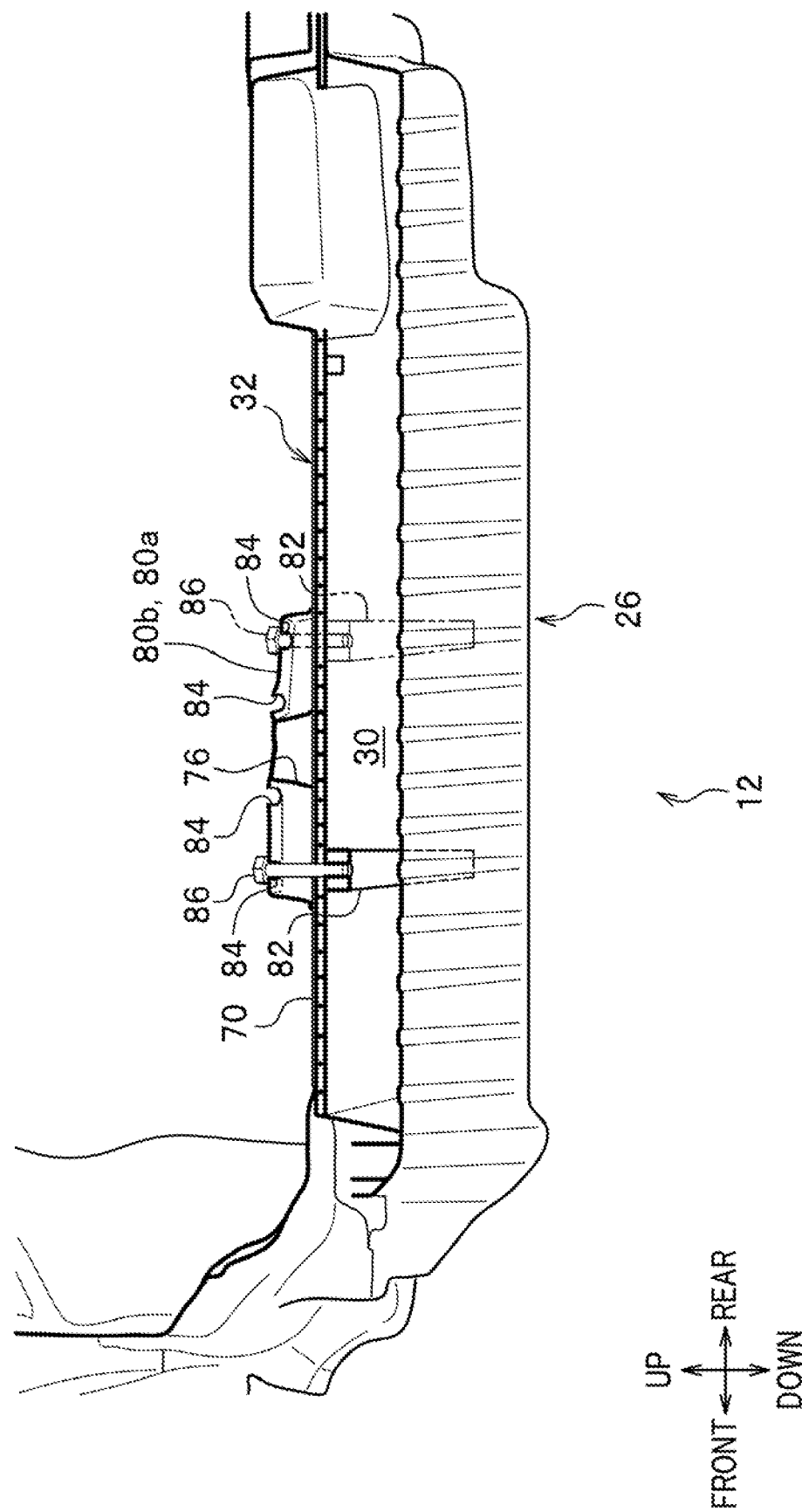
FIG. 9 corresponds to FIG. 6 and cross-sectionally shows the seat frame, floor panel, and battery cross member fastened via bolts to the case cover.

The battery cross member 82 is disposed in the chamber 30 within the battery case 12, as shown in FIG. 9. The battery cross member 82 is coupled by bolts 86 to be inserted through the mounting holes 84 of the outer seat frames 80a and inner seat frames 80b of the seat frames 74 and then fastened by nuts (not shown), as shown in FIGS. 6 and 9. That is, the outer seat frames 80a (or the inner seat frames 80b), the floor panel 70, and the battery cross member 82 are fastened via the bolts 86 to the top or bottom surface of the case cover 32.

The battery cross member 82 is arranged so that the mounting position is adjustable in the vehicle front-rear direction. That is, any mounting holes 84 may be selected out of the mounting holes 84 arranged in the vehicle front-rear direction to mount the battery cross member 82 by the bolts 86 and nuts (not shown) to the outer seat frames 80a and inner seat frames 80b, to change a mounting position in the vehicle front-rear direction of the battery cross member 82 as desired. Note that arrows outlined by bold lines in FIG. 6 indicate a range of change in the mounting position in the vehicle front-rear direction of the battery cross member 82.

The vehicle 10 having the vehicle substructure of the present embodiment is basically configured as described above, and advantageous effects thereof are described next. FIG. 8 is a schematic cross-sectional view indicating a lateral collision load inputted to the side sill being transmitted inward in the vehicle width direction along the case cover. FIG. 9 corresponds to FIG. 6 and cross-sectionally shows the seat frame, floor panel, and battery cross member fastened via bolts to the case cover In the present embodiment, when a lateral collision load F is inputted to the side sill 20, for example, the lateral collision load F is efficiently transmitted inward in the vehicle width direction along the case cover 32 having high rigidity and high strength (see FIG. 8). As a result, the present embodiment prevents the side sill 20 from being turned when the lateral collision load F is inputted.

In addition, in the present embodiment, the seat frames 74 extend in the vehicle front-rear direction and are provided in that direction with the mounting holes 84 to fasten the battery cross member 82. This allows, in the present embodiment, for suitably adjusting the mounting position (fastening position by the bolts 86) in the vehicle front-rear direction of the battery cross member 84. As a result, arrangement in the battery case 12 is changeable in the present embodiment, depending on the type and/or size of batteries, to allow for arranging the battery cross member 82 at a position vertically overlapping the seat frames 74 having high rigidity and strength.

Further, the seat frames 74 of the present embodiment include the pair of right and left outer seat frames 80a connected to the side sills 20, and the pair of right and left inner seat frames 80b connected to the center tunnel 78. The outer seat frames 80a and inner seat frames 80b are respectively provided, in the vehicle front-rear direction thereof, with the mounting holes 84. The mounting holes 84 in the outer seat frames 80a are in a longhole shape. The mounting holes 84 in the inner seat frames 80b are in a circular shape. This allows in the present embodiment for absorbing installation error at the time of mounting the battery cross member 82 on the seat frames 74, manufacturing error, or the like.

Furthermore, in the present embodiment, the outer seat frame 80a includes the horizontal plate 74a extending substantially horizontally, and the vertical wall 74b curved at an inner end in the vehicle width direction of the horizontal plate 74a and extending downward so as to cross-sectionally have an L-shape. The outer end 74d in the vehicle width direction of the horizontal plate 74a is joined to the side sill 20, and the lower end 74e of the vertical wall 74b is joined to the top surface of the floor panel 70. The horizontal plate 74a is provided, in the vehicle front-rear direction thereof, with the mounting holes 84.

In the present embodiment, the outer seat frame 80a connects the side sill 20 with the floor panel 70, by the horizontal plate 74a and vertical wall 74b to cross-sectionally have an L-shape, to suitably prevent the side sill 20 from being turned by a lateral collision load. Additionally, the outer seat frames 80a, the floor panel 70, and the battery cross member 82 are fastened to the case cover 32 via the bolts 86 inserted through the mounting holes 84 in the horizontal plate 74a, to further prevent the side sill 20 from being turned.

LIST OF REFERENCE SIGNS

10: vehicle, 12: battery case, 20: side sill, 26: case pan, 28: opening, 30: chamber, 32: case cover, 70: floor panel, 74: seat frame, 74a: horizontal plate, 74b: vertical wall, 74d: outer end in vehicle width direction, 74e: lower end, 78: center tunnel, 80a: outer seat frame, 80b: inner seat frame, 82: battery cross member (cross member), and 84: mounting hole.

What is claimed is:

1. A vehicle substructure for a battery case, comprising:
    a battery case having a battery housed therein and including a bottomed case pan having an opening at a top thereof, and a case cover to close the opening of the case pan;
    a floor panel positioned above the battery case;
    a pair of right and left seat frames fixed to a top surface of the floor panel; and
    a cross member extending in a vehicle width direction in the battery case and fastened to the pair of right and left seat frames,
    wherein
    the pair of right and left seat frames extend in a vehicle front-rear direction and are provided with mounting holes in the vehicle front-rear direction for fastening the cross member,
    the pair of right and left seat frames include a pair of right and left outer seat frames connected to side sills, and a pair of right and left inner seat frames connected to a center tunnel of the vehicle substructure,
    the outer seat frames and inner seat frames are respectively provided, in the vehicle front-rear direction thereof, with the mounting holes, and
    the mounting holes in the outer seat frames are in a longhole shape, and the mounting holes in the inner seat frames are in a circular shape.

2. The vehicle substructure as claimed in claim 1, wherein the outer seat frame includes a horizontal plate extending substantially horizontally, and a vertical wall curved at an inner end in the vehicle width direction of the horizontal plate and extending downward,
    an outer end in the vehicle width direction of the horizontal plate is joined to the side sill,
    a lower end of the vertical wall is joined to a top surface of the floor panel, and the horizontal plate is provided, in the vehicle front-rear direction thereof, with the mounting holes.

\* \* \* \* \*